US009340282B2

(12) United States Patent
Case et al.

(10) Patent No.: US 9,340,282 B2
(45) Date of Patent: May 17, 2016

(54) SYSTEM AND METHOD FOR DISPLAYING VERTICAL REFERENCE ON A ROTORCRAFT SYSTEM

(71) Applicant: HONEYWELL INTERNATIONAL INC., Morristown, NJ (US)

(72) Inventors: Timothy John Case, Marriottsville, MD (US); John Meeker, Albuquerque, NM (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/216,335

(22) Filed: Mar. 17, 2014

(65) Prior Publication Data

US 2015/0259075 A1    Sep. 17, 2015

(51) Int. Cl.
*B64C 27/00* (2006.01)
*G01C 5/00* (2006.01)
*G01C 23/00* (2006.01)

(52) U.S. Cl.
CPC ............... *B64C 27/00* (2013.01); *G01C 5/005* (2013.01); *G01C 23/00* (2013.01)

(58) Field of Classification Search
CPC ........... B64F 1/18; B64C 27/00; G01C 5/005; G01C 23/00
See application file for complete search history.

(56) References Cited

U.S. PATENT DOCUMENTS

| 7,477,164 | B1 | 1/2009 | Barber |
| 7,898,435 | B2 | 3/2011 | Rogers et al. |
| 7,928,862 | B1 | 4/2011 | Matthews |
| 8,306,676 | B1 | 11/2012 | Ingvalson et al. |
| 8,576,093 | B2 | 11/2013 | Flotte et al. |
| 2004/0160341 | A1 | 8/2004 | Feyereisen et al. |
| 2006/0238377 | A1 | 10/2006 | Stiles et al. |
| 2006/0250280 | A1 | 11/2006 | Chen et al. |
| 2012/0139759 | A1* | 6/2012 | Anders .......................... 340/946 |
| 2012/0176497 | A1 | 7/2012 | Shadmi |

FOREIGN PATENT DOCUMENTS

| EP | 1906151 A2 | 4/2008 |
| WO | 2009081177 A2 | 7/2009 |

OTHER PUBLICATIONS

Extended EP Search Report for Application No. 15150993.2-1557 dated Aug. 20, 2015.

* cited by examiner

*Primary Examiner* — Fadey Jabr
*Assistant Examiner* — Basil T Jos
(74) *Attorney, Agent, or Firm* — Ingrassia Fisher & Lorenz, P.C.

(57) ABSTRACT

A method and system for maintaining visual vertical reference on a rotorcraft display during rotorcraft landing is provided. The method generates vertical poles and positions them on the rotorcraft display such that vertical reference as well as roll information may be quickly and easily comprehended by a pilot.

12 Claims, 6 Drawing Sheets

SYSTEM AND METHOD FOR DISPLAYING VERTICAL REFERENCE ON A ROTORCRAFT SYSTEM

STATEMENT REGARDING FEDERALLY SPONSORED RESEARCH OR DEVELOPMENT

This invention was made with Government support under: HR0011-11-C-0138 awarded by DARPA—Synthetic Vision Avionics Backbone. The Government has certain rights in the invention.

TECHNICAL FIELD

Embodiments of the subject matter described herein relate generally to rotorcraft display systems and, more particularly, to providing visual vertical reference on a rotorcraft display.

BACKGROUND

A modern rotorcraft display system visually conveys information obtained from various databases, sensors and transponders, organized as "information layers" (e.g., flight path information, Navigational Aids (NAVAID), airspace information, terrain information, weather information, traffic information, and the like). The various information layers are combined to provide a unified three dimensional (3D) graphical display (usually a 3D synthetic vision display) of the terrain overlaid with various symbolic and textual representations. This unified 3D graphical display is part of the rotorcraft display system. During rotorcraft operations, pilots are required to make accurate and fast interpretations of the information presented by all components of the rotorcraft display system.

Contemporary rotorcraft display systems generally utilize a combination of static low resolution and dynamic high resolution geographic information to generate the elevation and terrain component of the 3D graphical display. The 3D graphical display based on these two sources of information is generated on the primary flight display (PFD) of the rotorcraft display system, and the rotorcraft pilot is heavily dependent upon this information during the course of rotorcraft operations.

Landing is a complex rotorcraft operation. In landing operations, a rotorcraft landing point is often a very specific geographic location. The specific geographic location requires a pilot to quickly and fully comprehend the elevation and terrain containing and surrounding the landing point, and to react to all components of the rotorcraft display system with precise actions. The pilot utilizes elevation and terrain information provided by the rotorcraft 3D graphical display during landing operations. In addition to the pressure associated with quickly and fully comprehending the information provided by all components of the rotorcraft display system, the vertical component of elevation and terrain data provided on a 3D graphical display may be especially complex when the terrain surrounding the landing point is unfamiliar or unimproved. The absence of a familiar, reliable vertical reference within the elevation and terrain data makes (1) landing in unfamiliar terrain particularly difficult, and (2) gauging rotorcraft roll (rotation about an axis running from nose to tail) more difficult.

Thus, a method for providing visual vertical reference on a rotorcraft 3D graphical display during rotorcraft landing operations is desired. The desired method will generate two static vertical reference poles of a predetermined height and position them on the rotorcraft display such that a vertical reference as well as roll information may be quickly and easily comprehended by a pilot. This desired method will decrease pilot cognitive workload, and thus increase pilot situational awareness.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

A method is provided for maintaining visual vertical guidance during rotorcraft landing. A landing point is displayed, and a first reference symbol having a first, static, predetermined height at a first predetermined location with respect to the landing point is displayed. A second reference symbol having a second, static, predetermined height at a second predetermined location with respect to the landing point is also displayed.

A system for providing visual vertical guidance during rotorcraft landing is provided. The system includes a first source of terrain elevation data, a second source of rotorcraft position data, a user input device providing a landing point, and a display system. A processor is coupled to the first source, the second source, the user input device, and the display system. The processor is configured to: receive the landing point; create at least two vertical reference poles of a predetermined height according to the at least one parameter, and generate symbology on the display graphically representative of a composite image of the at least two vertical reference poles positioned at separate predetermined locations and the terrain elevation data proximate to the landing point.

Another method for providing visual vertical guidance during rotorcraft landing is provided. Terrain data and a landing point are obtained. A substantially circular line of a predetermined diameter, surrounding the landing point, is displayed. A first pole at a first predetermined location on the circular line is displayed, and a second pole at a second predetermined location on the circular line is displayed.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Figure 1:
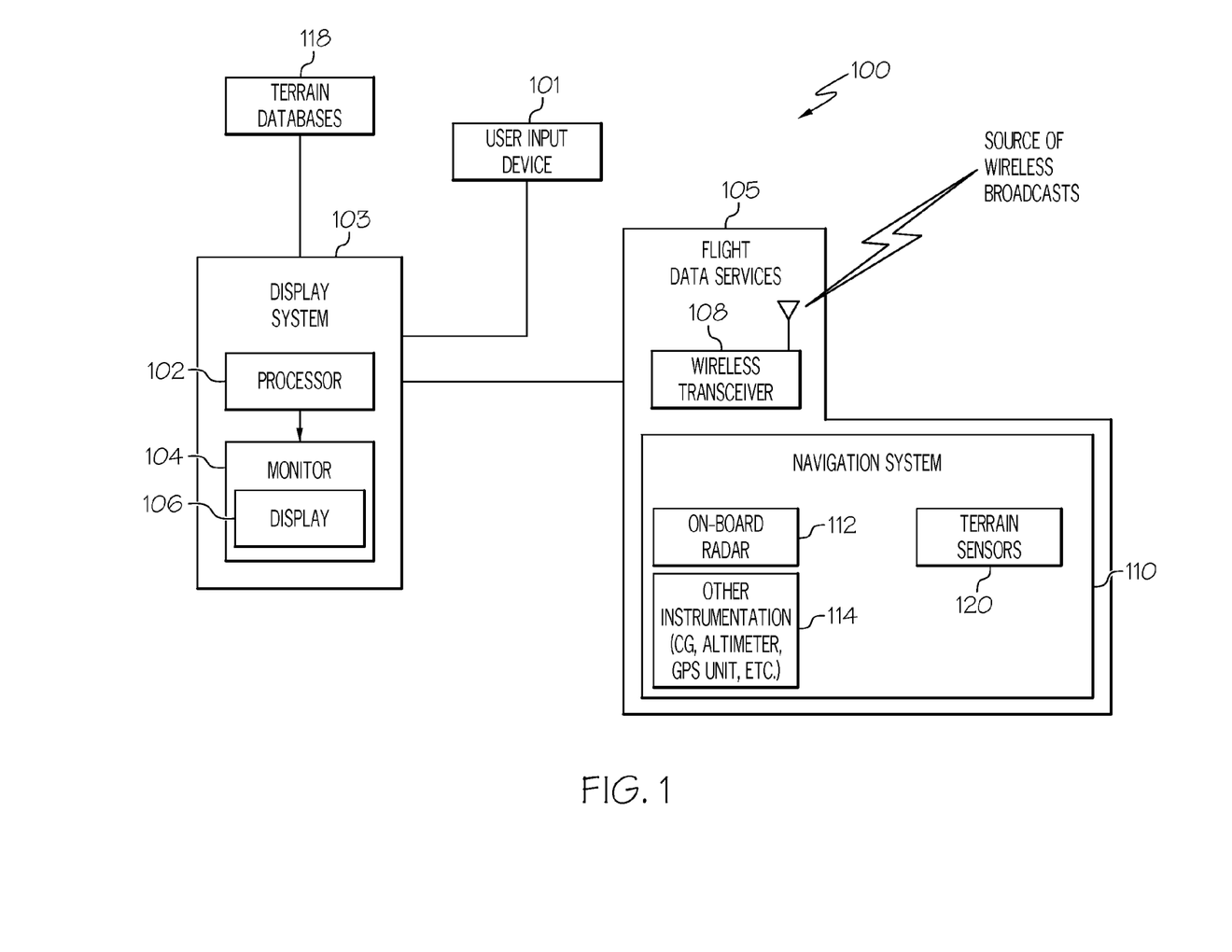
FIG. 1 is a block diagram of a generalized rotorcraft display system in accordance with an exemplary embodiment.

FIG. 1 is a block diagram of a generalized rotorcraft display system in accordance with an exemplary embodiment. Rotorcraft display system 100 includes a user input device 101, a display system 103, flight data services 105, and terrain databases 118. Display system 103 includes at least one processor 102, and at least one monitor 104, including a display 106, each of which is operatively coupled to processor 102. The user input device 101, display system 103, flight data services 105, and terrain databases 118 are also operatively coupled to the processor 102 within display system 103.

Flight data services 105 include a wireless transceiver 108 and a navigation system 110, which are operatively coupled to the processor 102. Navigation system 110 includes onboard radar 112 and other onboard instrumentation 114, such as a radio altimeter, a barometric altimeter, a global positioning system (GPS) unit, and the like. Navigation system 110 also includes terrain sensors 120, and depending upon the host aircraft, the navigation system 110 may be included within a FMS. Onboard radar 112 and terrain sensors 120 may be included within a Terrain Awareness and Warning System (TAWS), such as an Enhanced Ground Proximity Warning System (EGPWS). Terrain sensors may be additional on-board radar, or may be on-board Lidar or other instruments capable of dynamically ascertaining elevation and terrain information.

Flight data services 105 receive data from wireless transceiver 108 and the sensors and instruments included within the navigation system 110. Flight data services 105 continuously relay this data to processor 102. Depending upon the type of aircraft in which the embodiment is employed, wireless transceiver 108 may receive Traffic Information Services-Broadcast (TIS-B) data from external control sources, such as satellite and various ground-based facilities including Air Traffic Control Centers, Terminal Radar Approach Control Facilities, Flight Service Stations, control towers, and the like. In addition, wireless transceiver 108 may receive Automatic Dependent Surveillance-Broadcast (ADS-B) data and Traffic Collision Avoidance System (TCAS) data from neighboring aircraft, as well as weather information. TIS-B data, ADS-B data, TCAS data and other such external source data are preferably formatted to include air traffic state vector information, which may be utilized to determine a neighboring aircraft's current position and velocity.

Within display system 103, processor 102 may comprise, or be associated with, any suitable number of individual microprocessors, flight control computers, navigational equipment, memories, power supplies, storage devices, interface cards, and other standard components known in the art. In this respect, the processor 102 may include or cooperate with any number of software programs (e.g., rotorcraft display programs) or instructions designed to carry out the various methods, process tasks, calculations, and control/display functions described below. Depending upon the host aircraft, processor 102 may be included within a Flight Management Computer of the type commonly deployed within a Flight Management System (FMS). The processor 102 receives or obtains input from flight data services 105, terrain databases 118, terrain sensors 120, and user input device 101, and processes the combined information. In response to the various inputs, the processor 102 drives the monitor 104 to generate and update the display 106.

Image-generating devices suitable for use as monitor 104 include various analog (e.g., cathode ray tube) and digital (e.g., liquid crystal, active matrix, plasma, etc.) display devices. In certain embodiments, monitor 104 may assume the form of a Head-Down Display (HDD) or a Head-Up Display (HUD) included within an aircraft's Electronic Flight Instrument System (EFIS). Monitor 104 may be disposed at various locations throughout the cockpit. For example, monitor 104 may comprise a primary flight display (PFD) and reside at a central location within the pilot's primary field-of-view. Alternately, monitor 104 may comprise a secondary flight deck display, such as an Engine Instrument and Crew Advisory System (EICAS) display, mounted at a location for convenient observation by the aircraft crew but that generally resides outside of the pilot's primary field-of-view. In still further embodiments, monitor 104 may be worn by one or more members of the flight crew.

During operation of rotorcraft display system 100, the flight data services 105 continually provide processor 102 with navigational data pertaining to terrain, weather, neighboring aircraft, and the like. In contrast, the data from the one or more terrain databases 118 are generally uploaded prior to a flight. In response to this combination of input data, processor 102 drives monitor 104 to produce a 3D graphical display 106 that visually provides a pilot and crew with a composite of navigation information pertaining to the host aircraft, weather, navigational aids (NAVAID), elevation and terrain, and aircraft traffic. Processor 102 may provide the display 106 with a composite image in a two dimensional format (e.g., as a moving map display), or a three dimensional format (e.g., as a perspective display), or in a hybrid format (e.g., in a picture-in-picture or split screen arrangement).

Elevation and terrain information may be a combination of low resolution and high resolution geographic information. The terrain information is generally obtained from one or more existing terrain databases 118 and loaded a priori; example geographic databases include but are not limited to DTED as well as bare earth and Lidar survey Digital Elevation Maps data. The terrain databases 118 may provide configuration files and rotorcraft landing surface information. High resolution data may also be obtained and dynamically updated from terrain sensors 120. As described hereinabove, terrain sensors may be radar, Lidar, or other devices suitable for dynamically providing elevation and terrain information.

The user input device 101 may be realized as a keypad, touchpad, keyboard, mouse, touchscreen, joystick, knob, microphone, speech recognition, gestures or another suitable device adapted to receive input from a user. The pilot may adjust and customize aspects of the display and method by entering criteria at the user input device 101. Adjustments according to user input are performed by the processor 102.

Examples of user input parameters include, but are not limited to: the default height and default locations of the vertical reference poles; rotorcraft blade diameter, landing point data, and a distance referred to as the "push-back distance" (described hereinbelow). Additionally, user input device 101 may be used to set visual distinguishability effects of vertical reference poles, such as color banding. Color banding provides visually distinguishable sections on the vertical reference poles and may be referred to as thermometer banding. An embodiment may utilize color banding as follows. First, a vertical reference pole may be divided into pole sections of equal length and each section may be rendered to be visually distinguishable from the next section. Second, a color may be used to provide the visual distinguishability (in other cases grey scale or other techniques not reliant on color are used). When a rotorcraft enters into a position that is lower than the height of the vertical reference poles, the pole sections may be rendered in a visually distinguishable manner to represent the position of the aircraft. A visually distinguishable color band or pole section gives the pilot a visual depiction of the current height of the rotorcraft on the vertical reference poles. This can be used as an additional visual aid to guide the pilot down through the final hover to land portion of the flight.

Color banding may also be utilized to aid the pilot in gauging rotorcraft roll. As is demonstrated in FIGS. 4 and 5, when the rotorcraft is in a position where any roll has occurred, the two vertical reference poles may be rendered in visually distinguishable pole sections to indicate the direction and magnitude of the roll. This will provide a visual reference to the pilot and allow correction for vehicle roll, which may not otherwise be obvious during landing and/or takeoff operations. Again color may be utilized to render the visual distinguishability.

A customizable feature of this exemplary embodiment is the user input parameter "pushback distance," which is provided to improve situational awareness. Pushback distance is a distance at which the displayed static vertical reference poles automatically move away from the landing zone but stay within the pilot's field of view on the display. This was done to maintain the visual reference provided by the vertical reference poles in the 3D display as the helicopter approaches the landing point. Absent user preference input, the pushback distance is substantially 200 feet.

Figure 2:
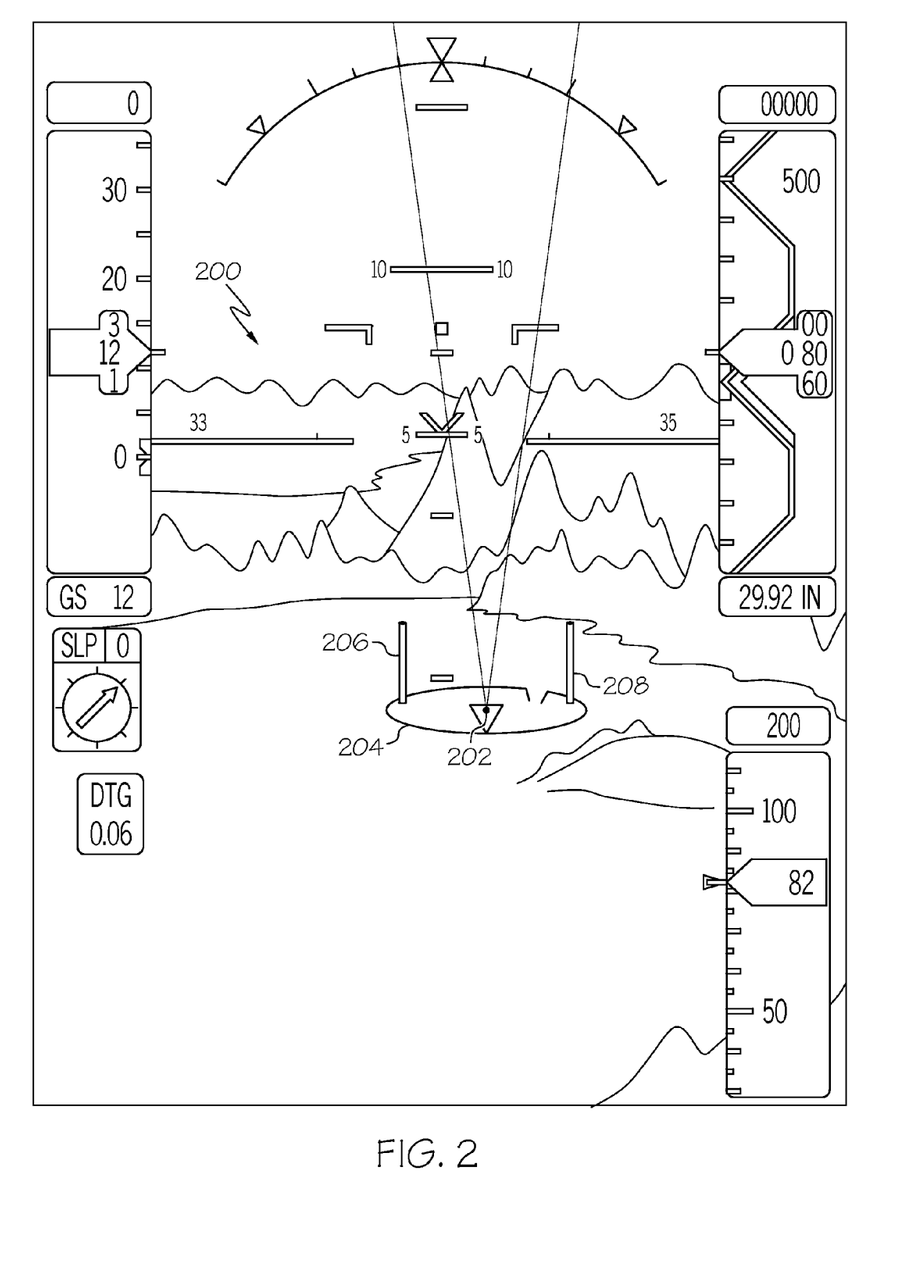
FIG. 2 illustrates a typical vertical reference display system graphic in accordance with an exemplary embodiment.

FIG. 2 illustrates a typical vertical reference display system graphic 200 in accordance with an exemplary embodiment, that is, FIG. 2 depicts a composite 3D graphical display of terrain and obstacles in the landing area overlaid with landing point 202 and circular boundary line 204. Circular boundary line 204 depicts the boundary of the landing zone, and may be generated consistent with a default diameter equivalent to the main rotor diameter of a helicopter. Two static vertical reference poles are shown overlaid at selectable locations on the circular boundary line 204.

A rotorcraft display system graphic such as vertical reference display system graphic 200 is generated as follows. Rotorcraft landing point or target information is obtained via user input into the user input device 101, flight data services 105, or is obtained from terrain databases 118. It is to be noted that, although the "landing point" may be referenced to or depicted in an illustration as a singular point, "landing point" as used herein includes three geographic points that represent the position of two front and a single rear wheel on a rotorcraft. The circular boundary line 204 is referred to as the boundary of the landing zone; displayed along with the landing point 202. In some embodiments, the circular boundary line 204 is equivalent to the main rotor diameter of the helicopter, and circular boundary line 204 may be adjusted to reflect different rotorcraft blade alignments.

Two static vertical reference poles are displayed on the circular boundary line at default positions with respect to the landing point. A first pole 206 is shown at substantially the ten-o'clock position with respect to the landing point 202, and the second pole 208 is shown at substantially the two o'clock position with respect to the landing point 202 (in an alternate embodiment, the vertical reference poles may default to substantially 300 degrees for the first pole and substantially 60 degrees for the second pole). The default position of the poles is chosen to allow the reference points to be in field of view without obscuring forward view in the synthetic view. With a landscape display, the location of the poles could be pushed out further to provide reference to allow a less obscured view in the forward direction. The poles have a default static height, for example, twenty feet.

As described herein, reference pole height, reference pole location, and landing zone diameter are user selectable parameters, along with other user selectable parameters described herein. A user enters user selectable customization parameters into the user input device 101, and the processor 102 within the display system 103 responds to user input parameters by generating or updating a composite image of the landing point (described above) enclosed in a landing zone, with static vertical reference poles, according to user input, overlaid on the elevation and terrain data in the 3D graphical display. Absent pilot entered adjustments, the location, height and visual characteristics are set to default values as described above. The combination of two reference poles, including the visualization effects, enables the pilot to gauge rotorcraft roll in addition to serving as a familiar vertical reference.

Figure 3:
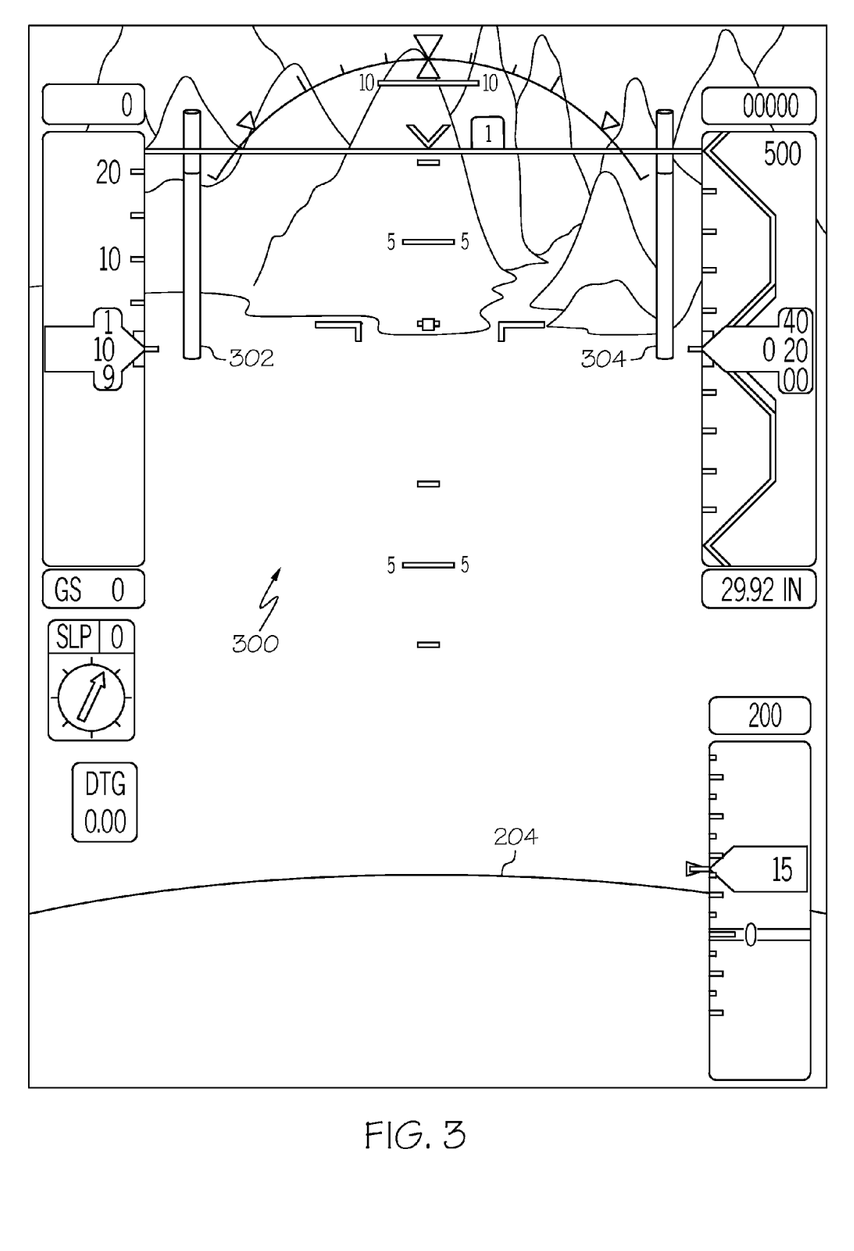
FIG. 3 illustrates a typical vertical reference display system graphic according to an exemplary embodiment.

FIG. 3 illustrates a typical vertical reference display system graphic 300 in accordance with an exemplary embodiment, depicting what may occur temporally after the image shown in FIG. 2, i.e., when the rotorcraft is closer to the landing point. In FIG. 3, a portion of the circular boundary line 204 is shown. The image in FIG. 3 illustrates the change in the overlaid image on the elevation and terrain data when the rotorcraft approaches the landing point. FIG. 3 depicts that the two static reference poles, first pole 302 and second pole 304, remain on-screen (and therefore within the pilot's field of view) in the 3D graphical display, but have been "pushed back" from the boundary line 204.

Figure 4:
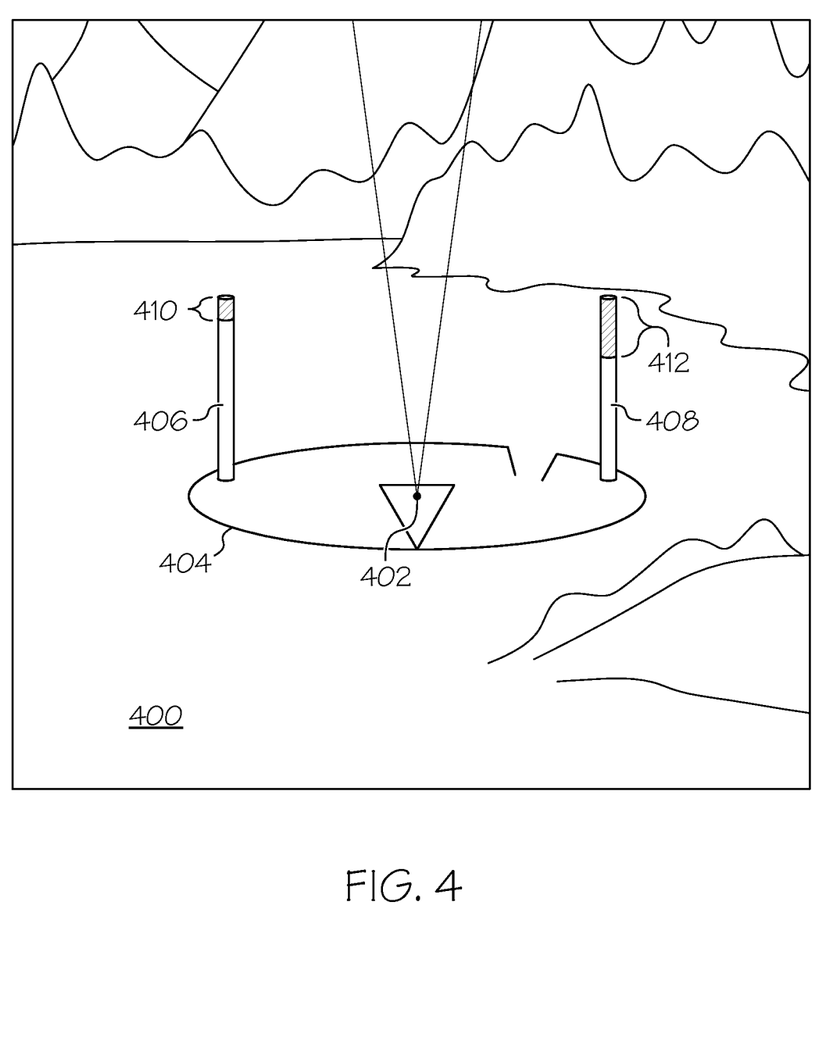
FIG. 4 illustrates a typical vertical reference display system graphic in accordance with an exemplary embodiment, in which rotorcraft roll right is depicted.

FIG. 4 illustrates a typical vertical reference display system graphic 400 in accordance with an exemplary embodiment depicting rotorcraft roll right. The landing zone 404, surrounding landing point 402, is shown. Vertical reference pole 406 and vertical reference pole 408 are depicted. The vertical reference poles employ visually distinguishable color banding in sections to indicate the rotorcraft roll right. As depicted, segment 412 of vertical reference pole 408 is larger than segment 410 of vertical reference pole 406, indicated a roll right.

Figure 5:
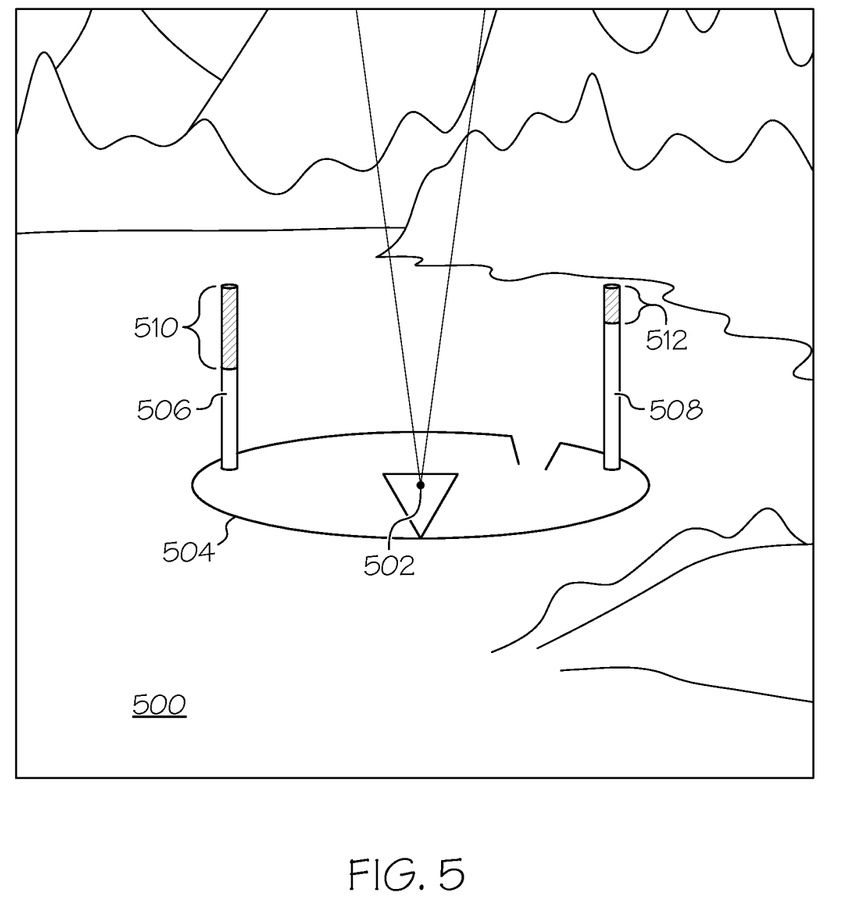
FIG. 5 illustrates a typical vertical reference display system graphic 500 in accordance with an exemplary embodiment, in which rotorcraft roll left is depicted.

FIG. 5 illustrates a typical vertical reference display system graphic 500 in accordance with an exemplary embodiment depicting rotorcraft roll left. The landing zone 504, surrounding landing point 502, is shown. Vertical reference pole 506 and vertical reference pole 508 are depicted. The vertical reference poles employ visually distinguishable color banding in sections to indicate the rotorcraft roll left. As depicted, segment 510 of vertical reference pole 506 is larger than segment 512 of vertical reference pole 508, indicated a roll left. FIGS. 4 and 5 illustrate a visual indicator provided by this exemplary embodiment to assist the pilot in the detection of, and correction for, rotorcraft roll that may not otherwise be obvious during landing and/or takeoff operations.

Figure 6:
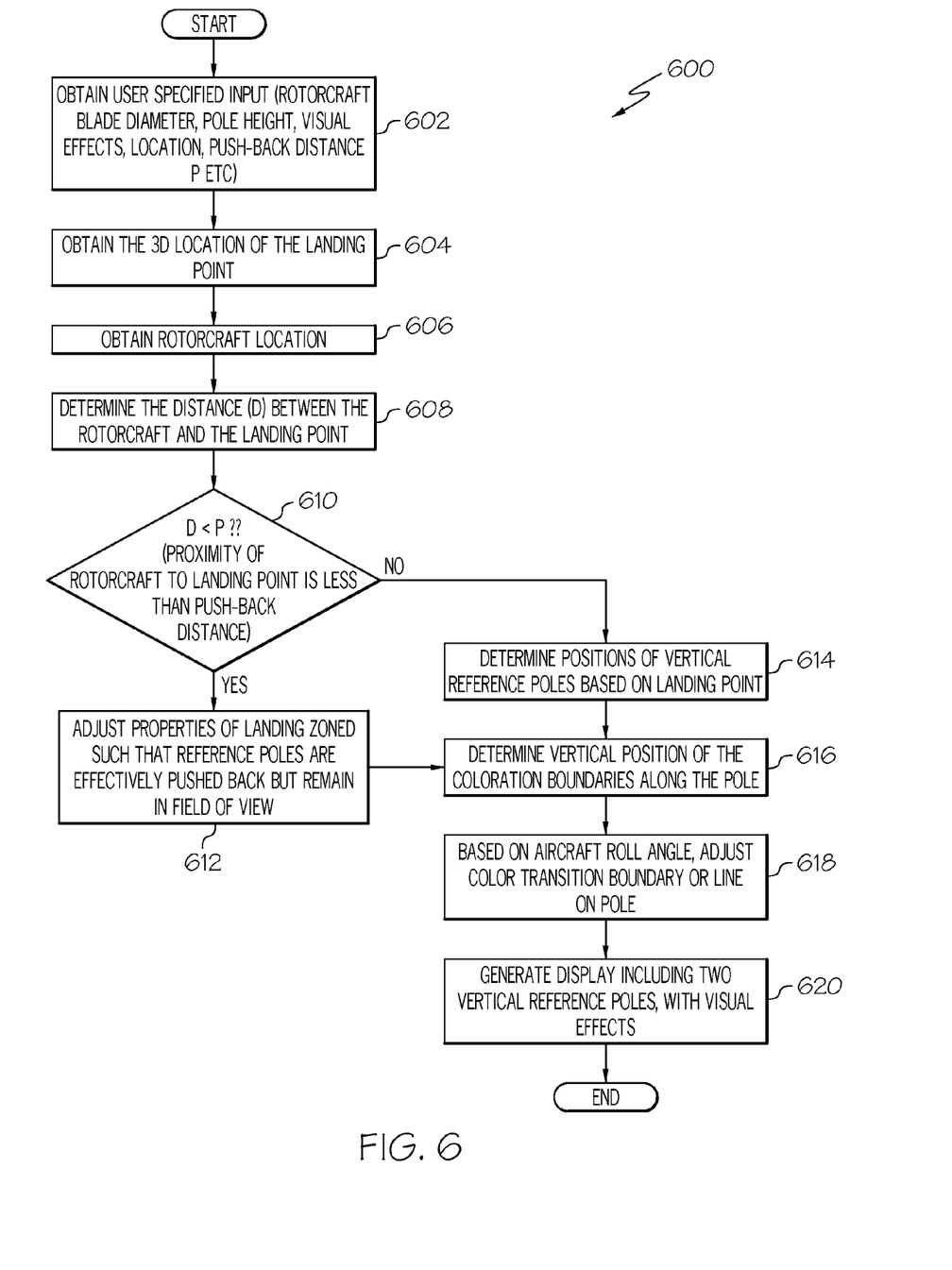
FIG. 6 is a flow chart describing steps of a vertical reference display process 600 in accordance with an exemplary embodiment.

FIG. 6 is a flow chart describing steps of a vertical reference display process 600 in accordance with an exemplary embodiment. While STEP 602-STEP 620 are arbitrarily shown as occurring in a sequence, in practice, these steps may be rearranged, and additional customization steps may be added.

The pilot enters customization requests such as vertical reference pole height, location and visual effects requirements into the user input device 101, from which the vertical reference display process 600 obtains user input parameters at STEP 602. The 3D landing point is obtained at STEP 604, generally in units of latitude, longitude, and altitude. Rotorcraft location is continuously monitored by vertical reference display process 600, but is shown as a discrete step at STEP 606. In response to the rotorcraft location information, the vertical reference display process 600 determines the distance between the rotorcraft and the landing point (STEP 608).

When the distance between the rotorcraft and the landing point is greater than or equal to the push-back distance (STEP 610), process 600 determines the position of the vertical reference poles based on the landing point data (STEP 614). In this scenario, the vertical reference poles appear to be located on the boundary line of the landing zone. As mentioned hereinabove, the landing zone generally reflects the rotorcraft blade diameter.

When the distance between the rotorcraft and the landing point is less than the push-back distance (STEP 610), the vertical reference display process 600 adjusts the display of the landing zone such that the vertical reference poles are effectively pushed away ("pushed back") from the landing zone; however, the reference poles continue to be displayed within the field of view of the pilot (STEP 612) (see, for example, FIG. 3). The process generally displays the vertical reference poles within the pilot's field of view, but pushed away from the landing zone, until the pilot lands the rotorcraft. The vertical reference poles are not moved again until the rotorcraft distance is greater than, or equal to, the push-back distance, at which time the vertical reference poles are relocated on the boundary line of the landing zone.

After process 600 determines the location of the vertical reference poles, the vertical position of the visually distinguishable boundaries are determined. As mentioned above, in some embodiments, the visual distinguishability may be rendered as coloration transition boundaries along the pole (STEP 616). This step utilizes user preference input supplied via the user input device 101.

At STEP 618 process 600 adjusts the visually distinguishable boundaries to visually indicate rotorcraft roll. Again, the visual distinguishability may be rendered as color transition boundaries. At STEP 620 the composite 3D image of the elevation and terrain data, the landing point, landing zone and static vertical reference poles according to user input parameters is displayed.

Thus, there has been provided a method and system for maintaining visual vertical reference on a rotorcraft display during rotorcraft landing. The method generates two vertical reference poles and positions them on the rotorcraft display such that vertical reference as well as roll information may be quickly and easily comprehended by a pilot.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing visual vertical guidance during rotorcraft landing, the method comprising:
   displaying a landing point;
   displaying a first pole having a first, static, predetermined height at a first predetermined location with respect to the landing point;
   displaying a second pole having a second, static, predetermined height at a second predetermined location with respect to the landing point;
   obtaining terrain and elevation data;
   obtaining rotorcraft position data;
   dividing the first pole into equal first pole sections of a predetermined size;
   dividing the second pole into equal second pole sections of the predetermined size;
   rendering the first pole and the second pole in visually distinguishable pole sections indicative of rotorcraft position above the terrain; and
   separately altering the size of the visually distinguishable pole sections of the first pole and second pole to indicate rotorcraft roll.

2. The method of claim 1, wherein the step of displaying a first pole further comprises positioning the first pole at a location substantially consistent with 300 degrees on a circle representative of a landing zone, and wherein the step of displaying a second pole further comprises positioning the second pole at a location substantially consistent with 60 degrees on the circle representative of the landing zone.

3. The method of claim 1, wherein the step of displaying a landing point further comprises displaying a substantially circular line of a predetermined diameter surrounding the landing point.

4. The method of claim 1, further comprising:
selectively changing the first predetermined location and the second predetermined location according to the rotorcraft position.

5. A system for providing visual vertical guidance during rotorcraft landing, the system comprising:
a first source of terrain and elevation data;
a second source of rotorcraft position data;
a user input device providing a landing point;
a display system; and
a processor coupled to the first source, the second source, the user input device, and the display system, the processor configured to:
obtain the landing point;
create at least two vertical reference poles of a predetermined height;
generate symbology on the display graphically representative of a composite image of (i) the terrain and elevation proximate to the landing point, and (ii) the at least two vertical reference poles positioned at separate predetermined locations, and rendered in visually distinguishable sections representative of rotorcraft position above the terrain; and
separately alter a size of visually distinguishable sections of respective vertical reference poles to indicate direction and magnitude of rotorcraft roll.

6. The system of claim 5, wherein the processor is further configured selectively position the at least two vertical reference poles with respect to the landing point.

7. The system of claim 5, wherein the processor is further configured to selectively change the first predetermined location and the second predetermined location according to the rotorcraft position.

8. A method for providing visual vertical guidance during rotorcraft landing, the method comprising:
obtaining terrain data;
obtaining a landing point;
obtaining rotorcraft position data;
displaying a substantially circular line of a predetermined diameter surrounding the landing point;
displaying a first pole at a first predetermined location on the circular line;
displaying a second pole at a second predetermined location on the circular line; and
separately rendering the first pole and the second pole in visually distinguishable pole sections indicative of rotorcraft position above the terrain.

9. The method of claim 8, wherein displaying a first pole further comprises displaying a first pole of a first predetermined height; and wherein displaying a second pole further comprises displaying a second pole of a second predetermined height.

10. The method of claim 8, further comprising rendering the first pole and the second pole in visually distinguishable pole sections indicative of rotorcraft roll.

11. The method of claim 10, further comprising rendering the pole sections visually distinguishable by color.

12. The method of claim 8, further comprising:
selectively changing the first predetermined location and the second predetermined location according to the rotorcraft position.

* * * * *